(12) United States Patent
Komatsubara et al.

(10) Patent No.: US 9,194,234 B2
(45) Date of Patent: Nov. 24, 2015

(54) FIXTURE FOR CONNECTING ROTORS OF ROTARY MACHINE AND METHOD OF CONNECTING ROTORS

(71) Applicant: MITSUBISHI HEAVY INDUSTRIES, LTD., Tokyo (JP)

(72) Inventors: Takuya Komatsubara, Tokyo (JP); Kenichi Arase, Tokyo (JP); Kimihiro Kikugawa, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 174 days.

(21) Appl. No.: 13/775,872

(22) Filed: Feb. 25, 2013

(65) Prior Publication Data

US 2014/0037452 A1  Feb. 6, 2014

(30) Foreign Application Priority Data

Aug. 6, 2012 (JP) ................................. 2012-174345

(51) Int. Cl.
 *F01D 5/02* (2006.01)
(52) U.S. Cl.
 CPC  *F01D 5/02* (2013.01); *F01D 5/026* (2013.01); *Y10T 29/49316* (2015.01)
(58) Field of Classification Search
 CPC ...... F01D 5/02; F01D 5/026; Y10T 29/49316
 See application file for complete search history.

(56) References Cited

U.S. PATENT DOCUMENTS 7,465,137 B2  12/2008  Dietz et al.

FOREIGN PATENT DOCUMENTS

| JP | 57-500703 A | 4/1982 |
| JP | 61-108521 U | 7/1986 |
| JP | 61-173825 U | 10/1986 |
| JP | 64-31211 U | 2/1989 |
| JP | 8-109909 A | 4/1996 |
| JP | 8-200381 A | 8/1996 |
| JP | 9-296826 A | 11/1997 |
| JP | 2012-77702 A | 4/2012 |

OTHER PUBLICATIONS

International Search Report of PCT/JP2013/054035, mailing date of Apr. 2, 2013, w/English translation.
Written Opinion of PCT/JP2013/054035, mailing date of Apr. 2, 2013, w/English translation.
Written Opinion dated Feb. 25, 2014, issued in Corresponding Application No. PCT/JP2013/054035, with English Translation (8 pages).

*Primary Examiner* — Moshe Wilensky
(74) *Attorney, Agent, or Firm* — Westerman, Hattori, Daniels & Adrian, LLP

(57) ABSTRACT

A fixture for connecting rotors of a rotary machine includes: an axial member provided with a column-like fitting portion which is disposed inside of a first bolt hole and fits the first bolt hole; and a sleeve provided with a cylindrical fitting portion which is disposed inside of a second bolt hole and fits the second bolt hole. The axial member further includes a tapered portion which is formed on an end portion of the column-like fitting portion, and is gradually reduced in diameter from the first bolt hole toward the second bolt hole. The cylindrical fitting portion of the sleeve is formed with a tapered hole which is gradually expanded in diameter from the second bolt hole toward the first bolt hole around an axis of the sleeve.

6 Claims, 6 Drawing Sheets

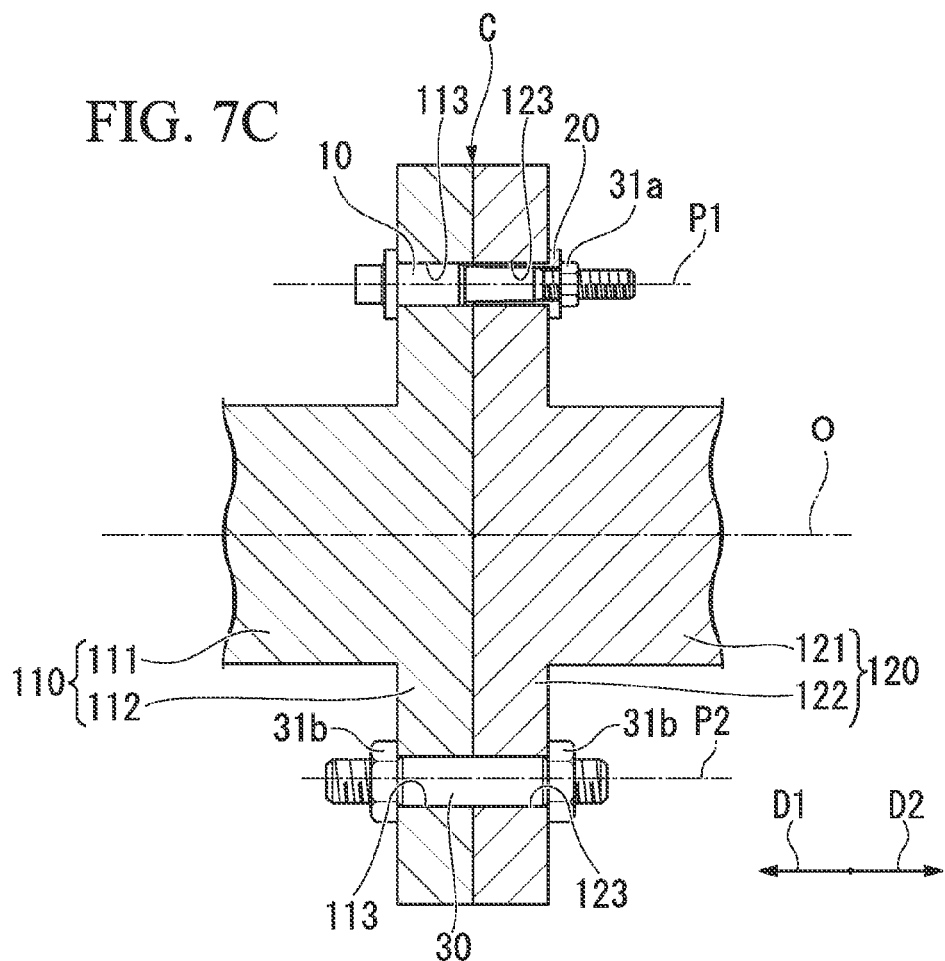

FIXTURE FOR CONNECTING ROTORS OF ROTARY MACHINE AND METHOD OF CONNECTING ROTORS

TECHNICAL FIELD

The present invention relates to a fixture for connecting rotors which is used when connecting divided rotors of a rotary machine. Priority is claimed on Japanese Patent Application No. 2012-174345 filed Aug. 6, 2012, the content of which is incorporated herein by reference.

BACKGROUND ART

A rotor of a rotary machine such as a gas turbine and a steam turbine, for example, is divided into a turbine side and an electric generator side in the axial direction, and the rotor is configured by connecting the divided rotors with each other. One example of such a rotor connection, for example, is disclosed in Patent: Document 1.

When connecting the rotors which are divided in a plural number in this manner, each rotor is suspended by an overhead crane, and an axial alignment between the rotors is performed by operating the crane while each rotor is suspended by the crane. Patent Document 2 is cited as another example of the connection of rotors.

PRIOR ART DOCUMENT

Patent Document

Patent Document 1: Japanese Unexamined Patent Application, First Publication No. 2012-77702
Patent Document 2: Japanese Unexamined Utility Model Application, First Publication No. S61-108521

SUMMARY OF INVENTION

Problem that the Invention is to Solve

Axial alignment of the rotors of a rotary machine which are suspended by the crane is very difficult, and it takes a considerable amount of time to do such an operation. Its workability is not good, and it is likely to become a cause of a cost increase.

An object of the present invention is to provide a fixture for connecting rotors of a rotary machine and a method of connecting rotors which allow easy axial alignment.

Means for Solving the Problem

To solve the above problem, the present invention has adopted the following means.

According to a first aspect of the present invention, there is provided a fixture for connecting rotors of a rotary machine, which is used to connect a first rotor and a second rotor to each other by butting a first flange portion provided on an end portion of the first rotor and a second flange portion provided on an end portion of the second rotor to each other, and then inserting a bolt through a first bolt hole which is formed in the first flange portion to a second bolt hole which is formed in the second flange portion, the fixture including: an axial member provided with as column-like fitting portion which is disposed inside of the first bolt hole, and fits the first bolt hole; and a sleeve provided with a cylindrical fitting portion which is disposed inside of the second bolt hole, and fits the second bolt hole. The axial member further includes as tapered portion which is formed at an end portion of the column-like fitting portion, and is gradually reduced in diameter from the first bolt hole toward the second boll hole. The cylindrical fitting portion of the sleeve is formed with a tapered hole which is gradually expanded in diameter from the second bolt hole toward the first bolt hole around an axis of the sleeve and is capable of fitting the tapered portion.

By using such a fixture for connecting the rotors of the rotary machine, the axial member and the sleeve installed in the first and second bolt holes are caused to approach each other. As a result, the tapered portion fits the tapered hole exactly. In such a state of fitting together, a central axis of the axial member and as central axis of the sleeve coincide. According to this, the axial lines of the first bolt hole and the second bolt hole coincide. Thus, the axial alignment of the first flange portion, and the second flange portion can be performed.

In addition, the axial member may include a tool hole which is formed to be dented in the axial direction around the axis of the axial member from an end portion of the first bolt hole side, and a male screw portion which is formed on an end portion of the tapered portion, and extends from the first bolt hole to the second bolt hole.

By using such a tool hole and a male screw portion, it is possible to fasten the sleeve to the axial member. Since, the tapered portion of the axial member and the tapered hole of the sleeve can he fitted together easily and certainly, the axial alignment of the first flange portion and the second flange portion can be performed. In addition, it is possible to easily detach the axial member and the sleeve.

In addition, a length of the cylindrical fitting portion in an axial direction may be less than or equal to a width of the second flange portion in the direction in which the bolt is inserted.

In this manner, since the cylindrical fitting portion does not protrude from the second flange portion toward the first flange portion when the cylindrical fitting portion fits the second bolt hole, the axial alignment of the first flange portion and the second flange portion is more easily performed.

Further, the axial member may include a first screw hole for installing a drawing tool which is formed to be dented in the axial direction of the axial member from the end portion of the first bolt hole side.

For example, when the drawing tool such as an eyebolt is screwed into the first screw hole, it is possible to easily draw the axial member out from the first bolt hole and the second bolt hole.

In addition, the sleeve may include a second screw hole for installing a drawing tool which is formed to be dented in the axial direction of the sleeve from the end portion of the second bolt hole side.

For example, when the drawing tool such as an eyebolt is screwed into the second screw hole, it is possible to easily draw the sleeve out from the second bolt hole.

According to a second aspect of the present invention, there is provided a method of connecting rotors, which connects a first rotor and a second rotor with each other by butting a first flange portion provided on an end portion of the first rotor and a second flange portion provided on an end portion of the second rotor, then inserting bolts through a plurality of first bolt holes which are formed in the first flange portion and a plurality of second bolt holes which are thrilled in the second flange portion, the method including: a connection preparation step of preparing a fixture for connecting rotors including an axial member provided with a column-like fitting portion which is disposed inside of the first bolt hole and fits the first bolt hole, and a sleeve provided with a cylindrical fitting portion which is disposed inside of the second bolt hole and fits the second bolt hole, in which the axial member is further provided with a tapered portion which is formed at an end portion of the column-like fitting portion, and is gradually reduced in diameter from the first bolt hole toward the second bolt hole, and the cylindrical fitting portion attic sleeve is provided with a tapered hole which is gradually expanded in diameter from the second bolt hole toward the first bolt hole around an axis of the sleeve; a fixture installation step of making the column-like fitting portion of the axial member lit any one of the plurality of the first bolt holes, and then making the tapered portion fit the tapered hole by making the cylindrical fitting portion of the sleeve it the second bolt hole corresponding to the first bolt hole; a bolt installation step of installing a bolt by inserting through any one of the first bolt holes and the second bolt holes, other than the first bolt hole or the second bolt hole in which the axial member and the sleeve are fitted in the fixture installation step; a fixture detaching step of detaching the axial member and the sleeve installed in the fixture installation step after the fixture installation step and the bolt installation step; and a bolt final installation step of installing the bolt by inserting through the first bolt hole and the second bolt hole from which the axial member and the sleeve have been detached in the fixture detaching step.

By such a method of connecting the rotors, it is possible to perform the axial alignment of the first flange portion and the second flange portion by making the tapered portion of the fixture for connecting the rotors fit the tapered hole thereof in the fixture installation step. While performing such an axial alignment, it is possible to install the bolt into all the first bolt holes and the second bolt holes, and to easily connect the first rotor and the second rotor.

Effects of the Invention

According to the fixture for connecting the rotors of the rotary machine and the method for connecting the rotors of the present invention, it is possible to easily perform the axial alignment by using the axial member provided with the tapered portion and the sleeve provided with the tapered hole.

BRIEF DESCRIPTION OF THE DRAWINGS

FIG. 7C is a view illustrating: a state in which a fixture installation step and a bolt installation step have been completed relating to a connecting fixture according to an embodiment of the present invention.

DESCRIPTION OF THE EMBODIMENTS

Hereinafter, a connecting fixture 1 (a fixture for connecting rotors in a rotary machine) according to an embodiment of the present invention will be described, but first of all, a rotor 100 to which the connecting fixture 1 is applied will be described.

The rotor 100 is used, for example, in the rotary machine such as a gas turbine or a steam turbine, and is a member which transmits a rotatory power.

Figure 1:
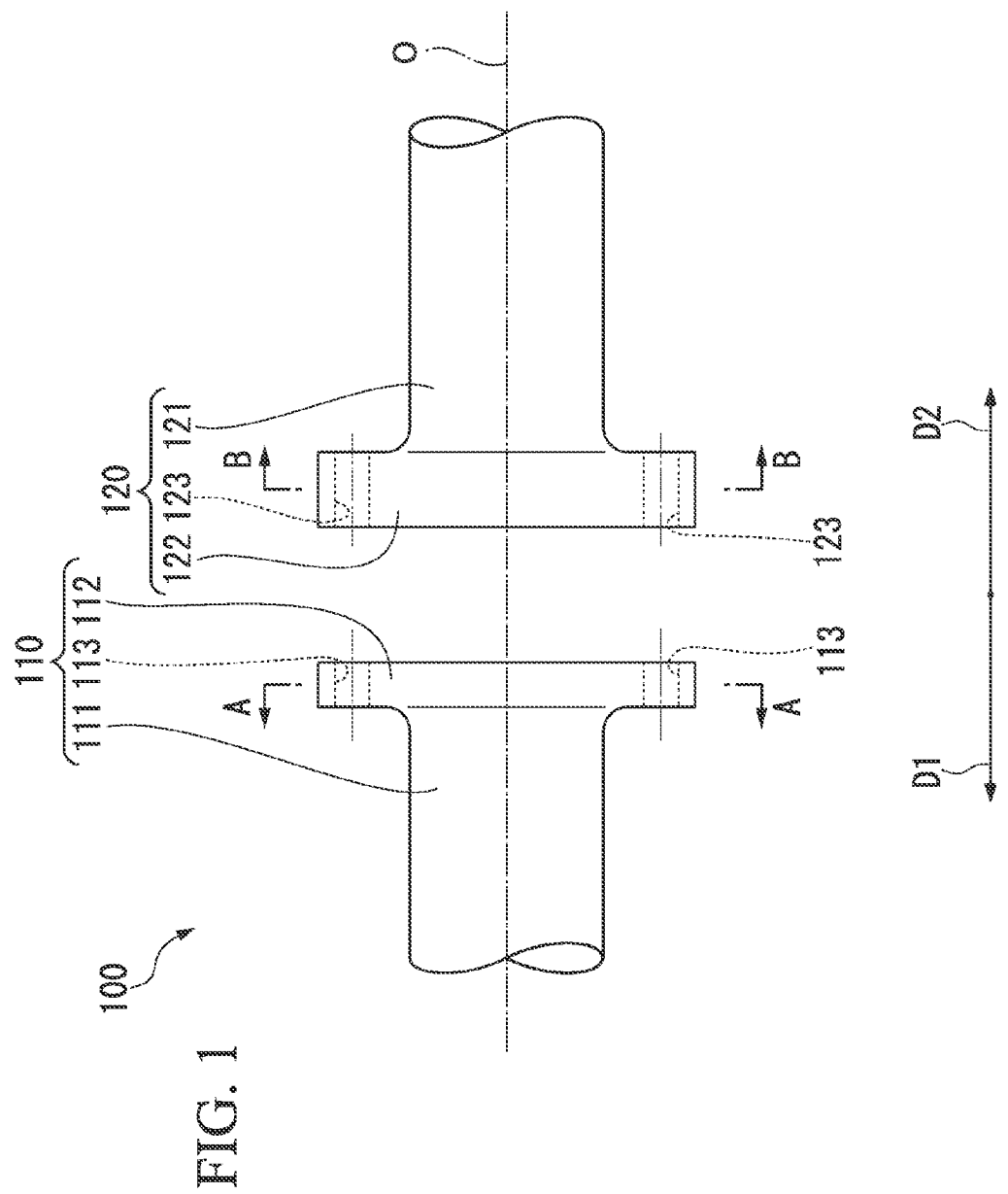
FIG. 1 is a view illustrating a main part of a rotor to which a connecting fixture according to an embodiment of the present invention is applied.
Figure 2A:
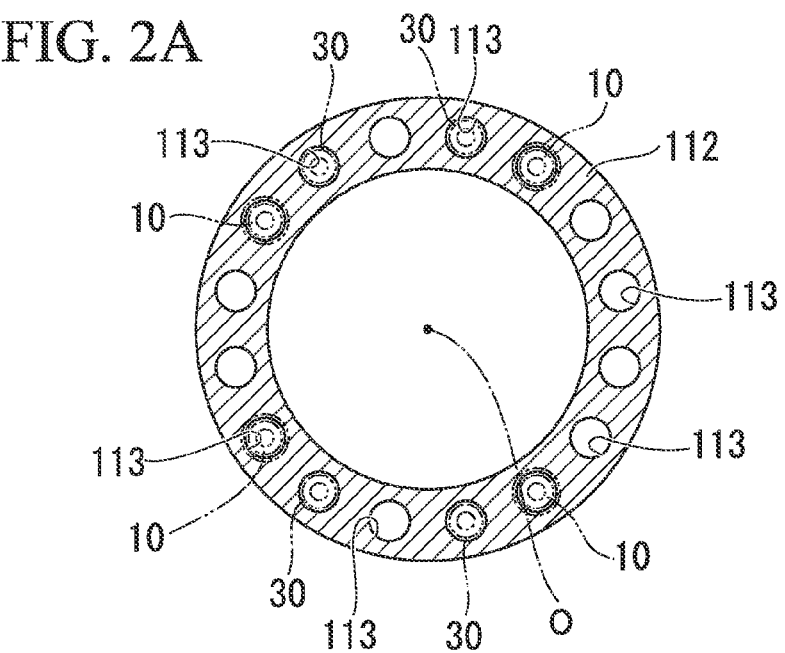
FIG. 2A is a cross-sectional view of a rotor to which a connecting fixture according to an embodiment of the present invention is applied, and illustrates a cross-section A-A of FIG. 1.
Figure 2B:
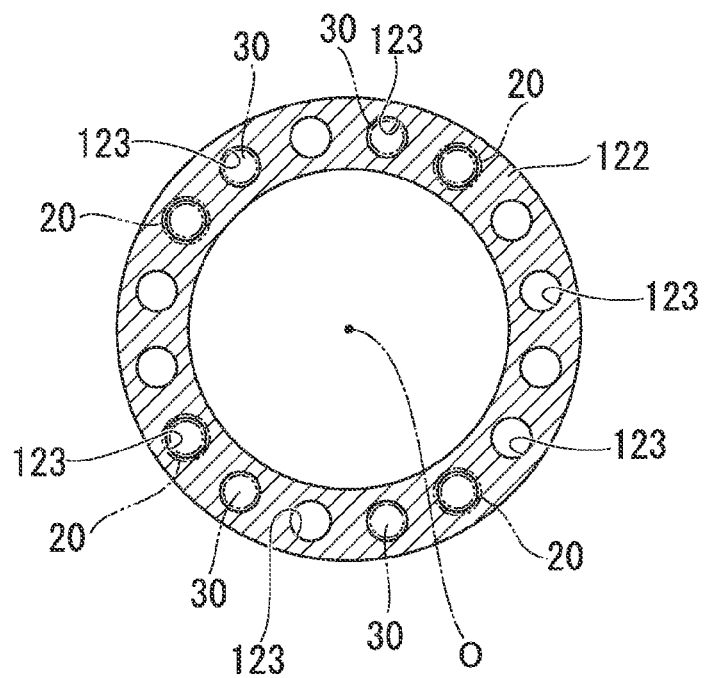
FIG. 2B is a cross-sectional view of a rotor to which a connecting fixture according to an embodiment of the present invention is applied, and illustrates a cross-section B-B of FIG. 1.

As shown in FIG. 1 and FIGS. 2A and 2B, the rotor 100 is configured by the first rotor 110, and the second rotor 120 connected to an end portion of the first rotor 110. Axial lines of the first rotor 110 and the second rotor 120 coincide mutually, and form an axial line O of the rotor 100. The rotor 100 formed of the first rotor 110 and the second rotor 120 is rotatable around the axial line O.

Hereinafter, the description will be given based on the following. The first rotor 110 is disposed in a first direction side D1 (in the embodiment, a left side when seeing a paper surface of FIG. 1 from the front) of the axial line O with respect to a connecting portion C (refer to FIG. 7C) between the first rotor 110 and the second rotor 120. In addition, the second rotor 120 is disposed in a second direction side D2 (in the embodiment, a right side when seeing a paper surface of FIG. 1 from the front) of the axial line O with respect to the connecting portion C.

The first rotor 110 includes a first main body portion 111 which forms a cylindrical shape, and a first flange portion 112 which is provided on an end portion of the second direction side D2 of the first main body portion 111, and forms a disc shape of a larger outer diameter than the first main body portion 111. The first flange portion 112 includes a plurality of first bolt holes 113 which are arranged circumferentially at intervals at positions radially outward from the outer diameter of the first main body portion 111 and are formed by passing, through the first flange portion 112 in a direction along the axial line O.

The second rotor 120, similarly, includes a second main body portion 121 which forms a cylindrical shape, and a second flange portion 122 which is provided on an end portion of the first direction side D1 of the second main body portion 121, and forms a disc shape of a larger outer diameter than the second main body portion 121. The second flange portion 122 includes a plurality of second bolt holes 123 which are arranged circumferentially at intervals at positions radially outward from the outer diameter of the second main body portion 121 and are formed by passing through the second flange portion 122 in a direction along the axial line O.

The first flange portion 112 and the second flange portion 122 have the same diameter. In addition, the first bolt holes 113 and the second bolt holes 123 are formed such that, when the first rotor 110 and the second rotor 120 are butted together on a concentric axis, the first bolt holes 113 and the second bolt holes 123 are disposed at the same circumferential position. In addition, the first bolt holes 113 and the second bolt holes 123 have the same inner diameter of holes.

Next, the connecting fixture 1 will be described.

Figure 3:
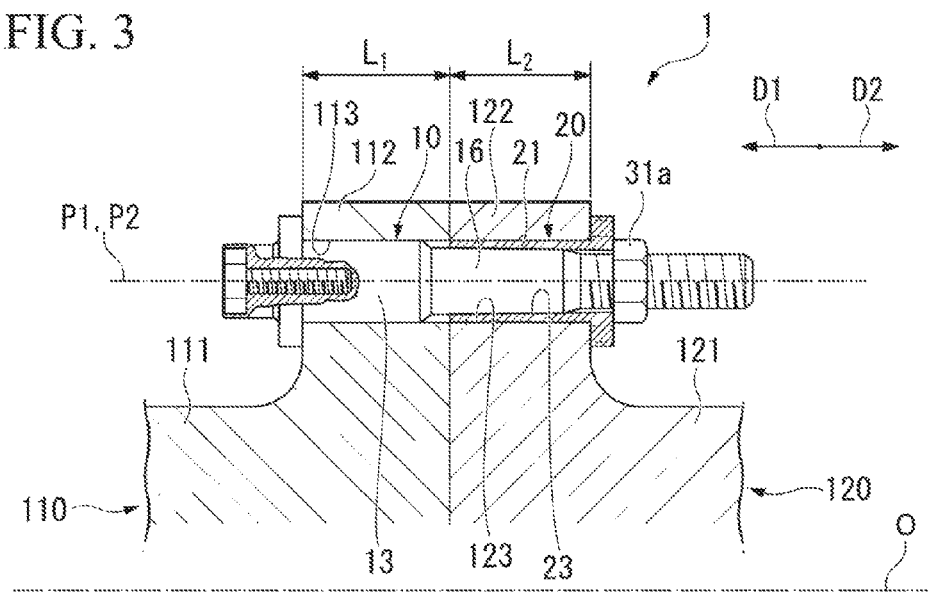
FIG. 3 is a view illustrating a state in which a connecting fixture according to the embodiment of the present invention is installed.

As shown in FIG. 3, the connecting fixture 1 includes an axial member 10 which fits the first bolt hole 113 and is disposed from the first bolt hole 113 to the second bolt hole 123, and a sleeve 20 which fits the second bolt hole 123 and fits the axial member 10 from an outer circumferential side.

Figure 4A:
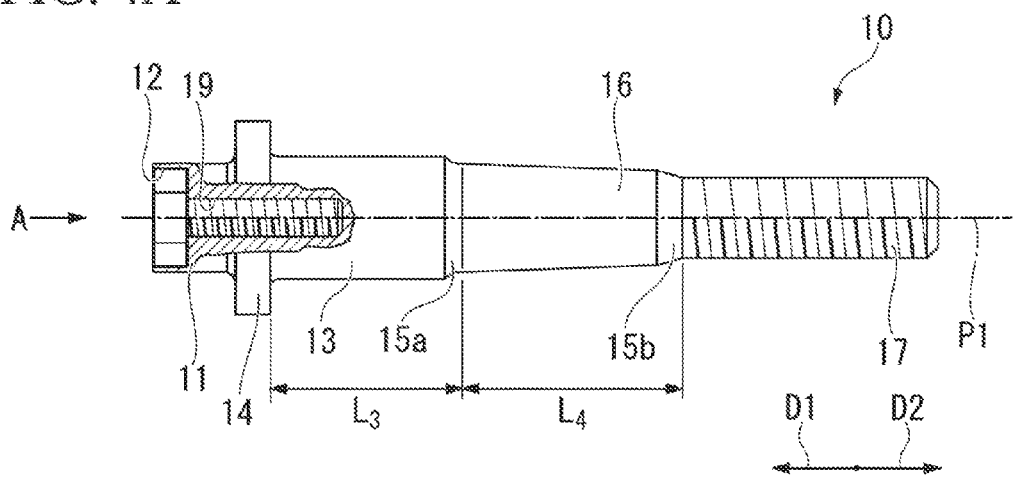
FIG. 4A is a view illustrating an axial member of a connecting fixture according to an embodiment of the present invention, which is a side view.
Figure 4B:
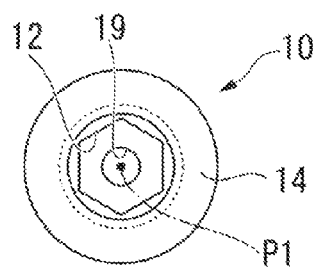
FIG. 4B is a view illustrating m axial member of a connecting fixture according to an embodiment of the present invention, and is a view in the direction of arrow A in FIG. 4A.

As shown in FIGS. 4A and 4B, the axial member 10 forms a pin shape around an axis P1, and includes a head portion 11 provided at the end portion of the first direction side D1, a stopper portion 14 provided at the second direction side D2 of the head portion 11, and a column-like fitting portion 13 provided at the second direction side D2 of the stopper portion 14.

In addition, the axial member 10 includes a tapered portion 16 formed through a chamfered portion 15a at the end portion of the second direction side D2 of the column-like fitting portion 13, and a male screw portion 17 formed through a chamfered portion 15b at the end portion of the second direction side D2 of the tapered portion 16.

The head portion 11 forms a cylindrical shape, and further, includes a hexagonal hole (tool hole) 12 which is formed to be dented from the first direction side D1 toward the second direction side D2 around an axis P1. At the center of the inside of the hexagonal hole 12, a first screw hole 19 is formed to be further dented from the first direction side D1 toward the second direction side D2 around the axis P1. Therefore, a screw (not shown) is capable of being screwed into the first screw hole 19.

The stopper portion 14 forms a disc shape of larger diameter than an inner diameter of the first bolt hole 113, and an end surface of the stopper portion 14 which faces the second direction side D2 contacts with the first flange portion 112 in such a state where the axial member 10 is installed in the first flange portion 112. Thus, it is possible to lock the entire axial member 10 to the first flange portion 112.

The column-like fitting portion 13 forms a column shape having an outer diameter equal to the inner diameter of the first bolt hole 113, and is capable of fitting the first bolt hole 113. In addition, the chamfered portion 15a is provided at the end portion of the second direction side D2. Further, between a total length $L_3$ of the column-like fitting portion 13 and the chamfered portion 15a along the axis P1, and a width $L_1$ of the first flange portion 112 along an axial line O, a relationship $L_1 \geq L_3$ of is established. In a state in which the axial member 10 is installed at the first flange portion 112, the entire column-like fitting portion 13 and the entire chamfered portion 15a are disposed inside of the first bolt hole 113. In such a state, the axial member 10 is unmovable in a radial direction of the first bolt hole 113.

The tapered portion 16 forms a truncated circular cone shape which is formed from the first direction side D1 toward the second direction side D2 through the chamfered portion 15a, and is gradually reduced in outer diameter from the column-like fitting portion 13. In addition, the tapered portion 16 is provided so that, in a state where the stopper portion 14 contacts with the first flange portion 112, at least a part of the tapered portion 16 is positioned inside of the second bolt hole 123.

The male screw portion 17 is positioned at the end portion of the second direction side D2, and forms a column shape of smaller diameter than the tapered portion 16. The male screw portion 17 is provided with the male screw on an outer circumferential surface of the column shape thereof. In addition, the male screw portion 17 is provided so that, in a state where the stopper portion 14 contacts with the first flange portion 112, at least a part of the male screw portion 17 protrudes from the second flange portion 122 toward the second direction side D2.

Among the width $L_1$ of the first flange portion 112 in the direction of the axis P1, a width $L_2$ of the second flange portion 122 in the direction of the axial line O, the total length $L_3$ of the column-like fitting portion 13 and the chamfered portion 15a in the direction of the axis P1, and a total length $L_4$ of the tapered portion 16 and the chamfered portion 15b in the direction of the axis P1, a relationship of $L_1+L_2>L_3+L_4$ is established.

Figure 5A:
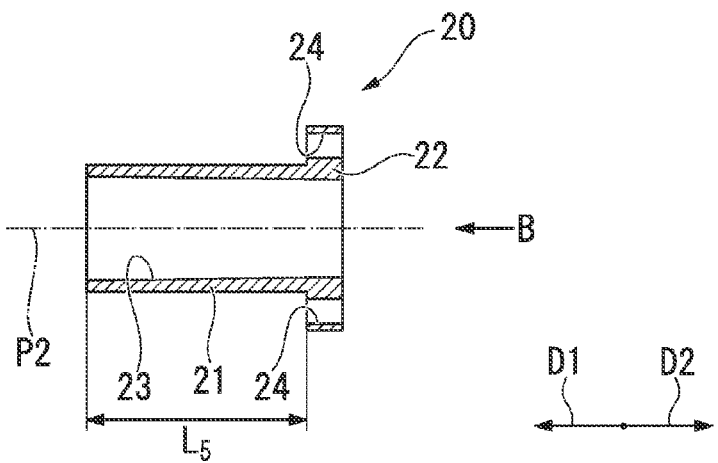
FIG. 5A is a view illustrating a sleeve of a connecting fixture according to an embodiment of the present invention, which is a side view.
Figure 5B:
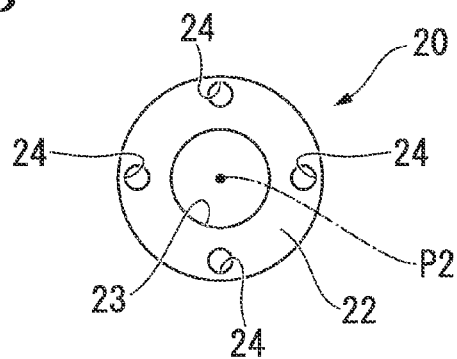
FIG. 5B is a view illustrating a sleeve of a connecting, fixture according to an embodiment of the present invention, and is a view in the direction of arrow B in FIG. 5A.
Figure 6:
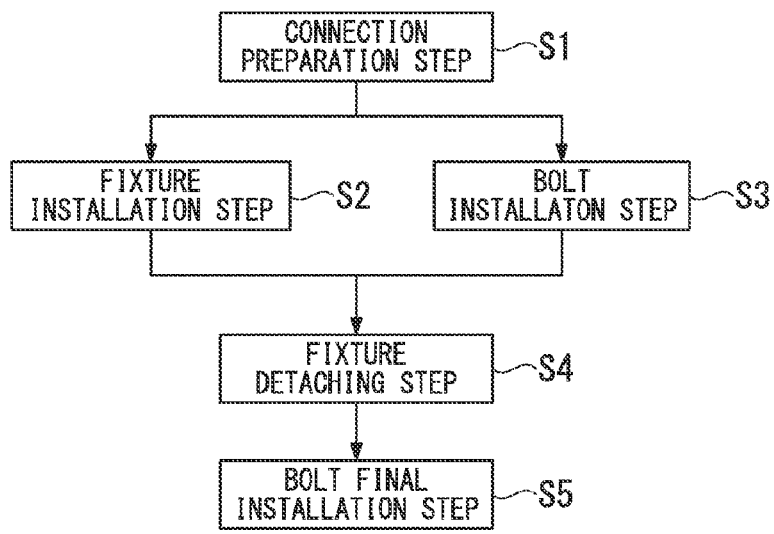
FIG. 6 is an operation flow chart illustrating a procedure of a method of connecting rotors relating to a connecting fixture according to an embodiment of the present invention.

As shown in FIGS. 5A and 5B, the sleeve 20 forms a cylindrical shape around an axis P2, and includes a cylindrical fitting portion 21 which fits the second bolt hole 123, and a sleeve stopper portion 22 provided at the second direction side D2 of the cylindrical fitting portion 21. In addition, in the sleeve 20, a tapered hole 23 which passes through the cylindrical fitting portion 21 and the sleeve stopper portion 22 in the direction of the axis P2 is formed.

The cylindrical fitting portion 21 forms a cylindrical shape, is positioned at the first direction side D1, and has an outer diameter equal to an inner diameter of the second bolt hole 123 so as to be capable of fitting the second bolt hole 123. In addition, between to length $L_5$ of the cylindrical fitting portion 21 in the direction of the axis P2, and the width $L_2$ of the second flange portion 122 in the direction of the axial line O, a relationship of $L_2 \geq L_5$ is established. In a state where the sleeve 20 is installed on the second flange portion 122, the entire cylindrical fitting portion 21 is disposed inside of the second bolt hole 123. In such as state, the sleeve 20 is unmovable in a radial direction of the second bolt hole 123.

The sleeve stopper portion 22 is positioned in the second direction side D2, forms a cylindrical shape of greater diameter than the inner diameter of the second bolt hole 123, and in a state where the sleeve 20 is installed on the second flange portion 122, an end surface of the sleeve stopper portion 22 which faces the first direction side D1 contacts with the second flange portion 122. Thus, it is possible to lock the entire sleeve 20 to the second flange portion 122.

The tapered hole 23 is formed by passing through the cylindrical fitting portion 21 and the sleeve stopper portion 22 in the direction of the axis P2, and is formed so as to he gradually expanded in diameter from the second direction side D2 toward the first direction side D1. The tapered hole 23 is capable of rightly fitting the tapered portion 16 of the axial member 10 from the outer circumferential side in a state where the stopper portion 14 of the axial member 10 contacts the first flange portion 112, and the sleeve stopper portion 22 contacts the second flange portion 122.

In addition, in the sleeve stopper portion 22, a plurality of second screw holes 24 are arranged circumferentially at internals, and are formed to be dented from the second direction side D2 toward the first direction side D1. The screw is capable of being screwed into the second screw hole 24.

Next, a procedure of the method of connecting the rotor 100 by using the connecting fixture 1 will be described.

As shown in FIGS. 6 and 7A to 7C, the method of connecting the rotor 100 includes a connection preparation step S1 of preparing the connecting fixture 1 by arranging the first rotor 110 and the second rotor 120 to face each other, and a fixture installation step S2 of installing the connecting fixture 1.

In addition, the method of connecting the rotor 100 includes a bolt installation step S3 of installing to bolt 30

(refer to FIG. 7C) to the first bolt hole 113 and the second bolt hole 123 excluding the positions at which the connecting fixture 1 has been installed in the fixture installation step S2.

Further, after the fixture installation step S2 and the bolt installation step S3, the method of connecting the rotor 100 includes a fixture detaching step S4 of detaching the connecting fixture 1, and a bolt final installation step S5 of finally installing the bolt 30 to the first bolt hole 113 and the second bolt hole 123 from which the connecting fixture 1 has been detached.

First, the connection preparation step S1 is performed. The first rotor 110 and the second rotor 120 are suspended by an overhead crane or the like. In addition, in a state of being suspended, the first rotor 110 and the second rotor 120 are butted together and disposed so that the first bolt hole 113 and the second bolt hole 123 corresponding thereto face each other. At this time, the axis P1 of the first bolt hole 113 and the axis P2 of the second bolt hole 123 which faces the first bolt hole 113 are in a state of axial misalignment.

Figure 7A:
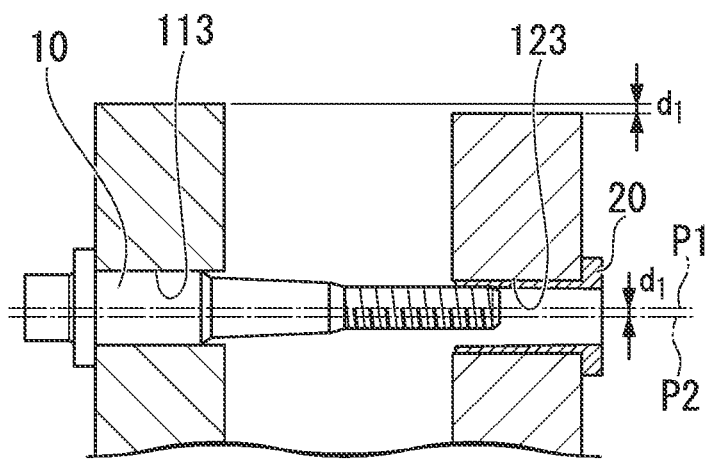
FIG. 7A is a time sequence view illustrating a fixture installation step relating to a connecting fixture according to an embodiment of the present invention.

Next, the fixture installation step S2 is performed. As shown in FIG. 7A, the stopper portion 14 is caused to contact with the first flange portion 112 by fining the axial member 10 to a predetermined number (for example, four) of the first bolt holes 113 from the first direction side D1. In addition, the sleeve stopper portion 22 is caused to contact with the second flange portion 122 by fitting, from the second direction side D2, the sleeve 20 to the second bolt hole 123 corresponding to the first bolt hole 113 in which the axial member 10 is arranged. At this time, between the first flange portion 112 and the second flange portion 122, axial misalignment in an amount of $d_1$ in the radial direction of the axial line O occurs. Similarly, the axial misalignment in the amount of $d_1$ occurs between the axis P1 and the axis P2 as well.

Figure 7B:
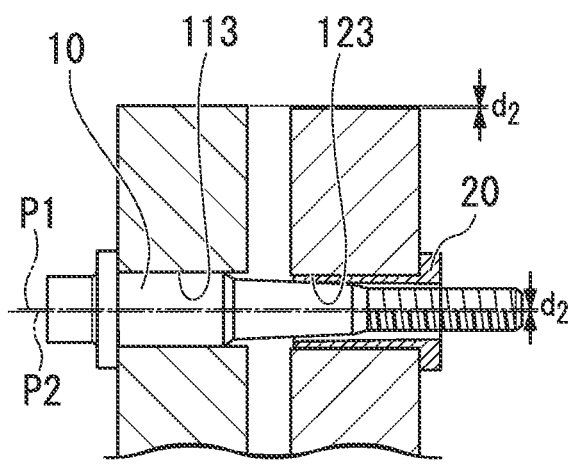
FIG. 7B is a time sequence view illustrating a fixture installation step relating to a connecting fixture according to an embodiment of the present invention.

In such a state, as shown in FIG. 7B, the amount of axial misalignment is reduced from $d_1$ to $d_2$ by bringing the first flange portion 112 and the second flange portion 122 closer to each other.

Thus, as shown in FIG. 7C, a nut 31a is screwed and fastened to the male screw portion 17 in a state where the male screw portion 17 of the axial member 10 protrudes from the sleeve 20 toward the second direction side. In addition, the tapered portion 16 of the axial member 10 is caused to fit the tapered hole 23 of the sleeve 20, and therewith, the first flange portion 112 and the second flange portion 122 are sandwiched between the stopper portion 14 of the axial member to and nut 31a.

Further, the bolt installation step 53 is performed. As shown in FIG. 7C, the bolt 30 is inserted, from the first bolt hole 113 through the second bolt hole 123, to a predetermined number (for example, four) of the first bolt holes 113 and the second bolt holes 123 excluding the positions at which the axial member 10 and the sleeve 20 are installed in the fixture installation step S2. In addition, the first flange portion 112 and the second flange portion 122 are sandwiched and connected to each other by screwing and fastening the nuts 31b to the bolt 30.

At this time, in the bolt installation step S3, the bolt 30 is installed to only the first bolt hole 113 and the second bolt hole 123 corresponding thereto axial centers of which have been caused to coincide by the fixture installation step S2 in a case where there are no coinciding axial centers of the first bolt holes 113 and the second bolt holes 123, the connecting fixture 1 is added by performing the fixture installation step S2 again. The fixture installation step S2 and the bolt installation step S3 are repeated in parallel, and finally, the bolt 30 or the connecting fixture 1 is installed to all of the first bolt holes 113 and the second bolt holes 123.

The bolt 30 is a reamer bolt, but the bolt 30 is not limited to the reamer bolt and a normal bolt may also be used.

Next, the fixture detaching step S4 is performed. In the bolt installation step S3, in a state where the nut 31b is fastened to the bolt 30, the connecting fixture 1 is detached by drawing the nut 31a from the axial member 10.

Finally, the bolt final installation step S5 is performed. The bolt 30 is installed by inserting through the first bolt hole 113 and the second bolt hole 123 from which the connecting fixture 1 has been detached in the fixture detaching step S4, and the first flange portion 112 and the second flange portion 122 are sandwiched to be connected together by the nuts 31b.

By using such connecting fixture 1, when the connecting fixture 1 is installed and the tapered portion 16 is caused to rightly fit the tapered hole 23 in the fixture installation step S2, the amounts of axial misalignment $d_1$ and $d_2$ become 0, and the axis P1 of the axial member 10 and the axis P2 of the sleeve 20 are positioned on the same axis. Thus, the axial lines of the fast bolt hole 113 and the second bolt hole 123 coincide.

Thus, a fitting of the tapered portion 16 of the axial member 10 and the tapered hole 23 of the sleeve 20, and an installation of the bolt 30 are performed by using all the first bolt holes 113 and the second bolt holes 123. Accordingly, in all the first bolt holes 113 and the second bolt holes 123 corresponding thereto, it is possible to make the axial centers coincide. Thus, the axial alignment of the first flange portion 112 and the second flange portion 122 can be performed.

In addition, after the bolt final installation step S5 has been finished, and the bolt 30 has been installed to all the first bolt holes 113 and the second bolt holes 123, finally, the axial member 10 and the sleeve 20 are all detached. For this reason, at the time of operating the rotor 100, they do not remain in the rotor 100.

Further, by the hexagonal hole 12 and the male screw portion 17 in the axial member 10, it is possible to fasten the nut 31a to the male screw portion 17 by inserting a hexagonal wrench to the hexagonal hole 12. For this reason, the axial member 10 and the sleeve 20 are firmly fastened, and it is possible to cause the tapered portion 16 of the axial member 10 and the tapered hole 23 of the sleeve 20 to fit easily and firmly.

In addition, it becomes easy to detach the nut 31a by the hexagonal hole 12. For this reason, it is possible to easily detach the axial member 10 and the sleeve 20.

In addition, by screwing, for example, the eyebolt and the like (not shown) to the first screw hole 19 of the axial member 10, it becomes possible to easily detach the axial member 10 from the first bolt hole 113. Similarly, by screwing the eyebolt and the like (not shown) to the second screw hole 24, it becomes possible to easily detach the sleeve 20 from the second bolt hole 123.

By using the connecting fixture 1 of the embodiment, it is possible to connect the first rotor 110 and the second rotor 120 easily.

In addition, the rotor 100 is not used with the connecting fixture 1 remaining in the rotor 100, as great strength is not necessary, and since the connecting fixture 1 can be repeatedly used, great cost advantages can be expected.

As mentioned above, a detailed description has been made regarding the embodiment of the present invention, but within a range which does not deviate from the technical idea of the present invention, it is possible to change the design to a certain degree.

For example, it is not always necessary to form the hexagonal hole 12 and the male screw portion 17 in the axial member 10, and the tapered portion 16 may be caused to fit the tapered hole 23 by hitting the axial member 10 and the sleeve 20 into the first bolt hole 113 and the second bolt hole 123. In such a case, it is possible to reduce the cost of the axial member 10.

Similarly, it is not always necessary to form the first screw hole 19 of the axial member 10, and the second screw hole 24 of the sleeve 20, and a formation position and a quantity, and the like are also not limited to the cases of the above-described embodiments.

In addition, as long as there is no problem of processibility with the axial member 10, it is not always necessary to form the chamfered portions 15a and 15b. The tapered portion 16 and the column-like fitting portion 13, and the tapered portion 16 and the male screw portion 17 may be formed to be smoothly continued on the outer circumferential surface.

Further, an installation direction of the axial member 10 and the sleeve 20 may be reversed. It is possible to install the axial member 10 from a second bolt hole 123 side, and the sleeve 20 from a first bolt hole 113 side. In this case, the aforementioned lengths of $L_1$, $L_2$, $L_3$, $L_4$, and $L_5$ need to be similarly considered.

In addition, in the aforementioned embodiments, the first rotor 110 is directly connected with the second rotor 120. However, it is possible to use the connecting fixture 1 even when connecting the first rotor 110 and the second rotor 120, for example, by inserting a connection shaft between the first rotor 110 and the second rotor 120.

[Industrial Applicability]

By the fixture for connecting the rotors of the rotary machine, and the method of connecting the rotors, it becomes possible to easily perform the axial alignment by using the axial member provided with the tapered portion and the sleeve provided with the tapered hole.

DESCRIPTION OF NUMBERS AND NUMERALS 1 connecting fixture (fixture for connecting rotors of rotary machine)
10 axial member
11 head portion
12 hexagonal hole (tool hole)
13 column-like fitting portion
14 stopper portion
15a, 15b chamfered portion
16 tapered portion
17 male screw portion
19 first screw hole
20 sleeve
21 cylindrical fitting portion
22 sleeve stopper portion
23 tapered hole
24 second screw hole
30 bolt
31a, 31b nut
100 rotor
110 first rotor
111 first main body portion
112 first flange portion
113 first bolt hole
120 second rotor
121 second main body portion
122 second flange portion
123 second bolt hole
P1 axis
P2 axis
D1 first direction side
D2 second direction side
O axial line S1 connection preparation step
S2 fixture installation step
S3 bolt installation step
S4 fixture detaching step
S5 bolt final installation step

The invention claimed is:

1. A method of connecting rotors of a rotary machine, which connects a first rotor and a second rotor to each other by butting a first flange portion provided on an end portion of the first rotor and a second flange portion provided on an end portion of the second rotor, so that a plurality of first bolt holes which are formed in the first flange portion is in communication with a plurality of second bolt holes which are formed in the second flange portion, the method comprising:

a connection preparation step of preparing a fixture for connecting rotors including an axial member provided with a column-like fitting portion which is disposed inside of the first bolt hole and fits the first bolt hole, and a sleeve provided with a cylindrical fitting portion which is disposed inside of the second bolt hole and fits the second bolt hole, in which the axial member is further provided with a tapered portion which is formed on an end portion of the column-like fitting portion, and is gradually reduced in diameter from the first bolt hole toward the second bolt hole, and the cylindrical fitting portion of the sleeve is provided with a tapered hole which is gradually expanded in diameter from the second bolt hole toward the first bolt hole around an axis of the sleeve;

a fixture installation step of making the column-like fitting portion of the axial member fit any one of the plurality of the first bolt holes, and then making the tapered portion fit the tapered hole by making the cylindrical fitting portion of the sleeve fit the second bolt hole corresponding to the first bolt hole;

a bolt installation step of installing a first bolt by inserting through any one of the first bolt holes and the second bolt holes, other than the first bolt hole or the second bolt hole in which the axial member and the sleeve are fitted in the fixture installation step;

a fixture detaching step of detaching the axial member and the sleeve installed in the fixture installation step after the fixture installation step and the bolt installation step; and a bolt final installation step of installing a second bolt through the first bolt hole and the second bolt hole from which the axial member and the sleeve have been detached in the fixture detaching step.

2. The method of connecting rotors of a rotary machine according to claim 1, wherein the axial member includes:

a tool hole for pulling a tool, the tool hole being formed in a pre-dented state in the axial direction around the axis of the axial member from an end portion of the first bolt hole side; and a male screw portion which is formed on an end portion of the tapered portion.

3. The method of connecting rotors of a rotary machine according to claim 1, wherein a length of the cylindrical fitting portion in an axial direction is less than or equal to a width of the second flange portion in the direction in which the bolt is inserted.

4. The method of connecting rotors of a rotary machine according to claim 1, wherein the axial member includes a first screw hole which is formed in a pre-dented state in the axial direction of the axial member from the end portion of the first bolt hole side, and wherein after a drawing tool is inserted into the first screw hole, the drawing tool is withdrawn to remove the axial member from the first and second bolt holes.

5. The method of connecting rotors of a rotary machine according to claim 1, wherein the sleeve includes a second screw hole which is formed in a pre-dented state in the axial direction of the sleeve from the end portion of the second bolt hole side, and wherein after a drawing tool is inserted into the second screw hole, the drawing tool is withdrawn to remove the sleeve from the first and second bolt holes.

6. The method of connecting rotors of a rotary machine according to claim 2, wherein a length of the cylindrical fitting portion in the axial direction is less than or equal to a width of the second flange portion in the direction in which the bolt is inserted.

\* \* \* \* \*